United States Patent
Hsu et al.

(10) Patent No.: US 10,687,321 B2
(45) Date of Patent: Jun. 16, 2020

(54) NETWORK COMMUNICATION LINK ADAPTATION SYSTEMS AND METHODS

(71) Applicant: MEDIATEK INC., Hsin-Chu (TW)

(72) Inventors: Chien-Fang Hsu, Hsin-Chu (TW); Yongho Seok, San Jose, CA (US); Chih-Shi Yee, Hsin-Chu (TW)

(73) Assignee: MEDIATEK INC., Taiwan (KR)

( * ) Notice: Subject to any disclaimer, the term of this patent is extended or adjusted under 35 U.S.C. 154(b) by 0 days.

(21) Appl. No.: 16/009,095

(22) Filed: Jun. 14, 2018

(65) Prior Publication Data

US 2018/0368118 A1 Dec. 20, 2018

Related U.S. Application Data

(60) Provisional application No. 62/522,146, filed on Jun. 20, 2017.

(51) Int. Cl.
*H04W 72/04* (2009.01)
*H04L 1/00* (2006.01)
(Continued)

(52) U.S. Cl.
CPC .......... *H04W 72/042* (2013.01); *H04B 7/063* (2013.01); *H04B 7/0643* (2013.01);
(Continued)

(58) Field of Classification Search
None
See application file for complete search history.

(56) References Cited

U.S. PATENT DOCUMENTS

2006/0248429 A1* 11/2006 Grandhi ............... H04L 1/1664
714/749
2012/0051246 A1* 3/2012 Zhang ............... H04L 1/0001
370/252
(Continued)

OTHER PUBLICATIONS

IEEE, IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE Standards Association, Dec. 7, 2016, Revision of IEEE Std 802.11-2012, IEEE Computer Society, XP068113034.

(Continued)

*Primary Examiner* — Warner Wong

(57) ABSTRACT

Presented systems and methods facilitate efficient and effective communication link adaptation. In one embodiment, a system comprises: a first communication device configured to forward link adaptation information, and a second communication component configured to receive the link adaptation information. The system is part of a wireless local area network (WLAN). The link adaptation information can include Modulation and Coding Scheme (MCS) Feed Back (MFB) related information in a communication frame. The communication frame can include a first field and a second field. The first field indicates the information is being forwarded as unsolicited MFB information or is associated with a solicitation request for the MFB information. The second first field indicates whether the information is MFB information or a request for MFB information.

21 Claims, 16 Drawing Sheets

(51) Int. Cl.
*H04B 7/06* (2006.01)
*H04W 16/28* (2009.01)
*H04W 84/12* (2009.01)
*H04B 7/0452* (2017.01)

(52) U.S. Cl.
CPC .......... *H04L 1/0003* (2013.01); *H04L 1/0009* (2013.01); *H04L 1/0026* (2013.01); *H04L 1/0033* (2013.01); *H04L 1/0036* (2013.01); *H04B 7/0452* (2013.01); *H04B 7/0617* (2013.01); *H04W 16/28* (2013.01); *H04W 84/12* (2013.01)

(56) References Cited

U.S. PATENT DOCUMENTS

| | | | | |
|---|---|---|---|---|
| 2012/0250668 A1* | 10/2012 | Sampath | ............... | H04L 1/0039 370/338 |
| 2012/0250796 A1* | 10/2012 | Sampath | ............... | H04L 1/0025 375/316 |
| 2012/0257606 A1* | 10/2012 | Sampath | ............... | H04L 1/0003 370/338 |
| 2013/0010632 A1* | 1/2013 | Wang | ............... | H04B 17/24 370/252 |
| 2013/0235836 A1* | 9/2013 | Roh | ............... | H04L 1/0031 370/329 |
| 2013/0250904 A1* | 9/2013 | Kang | ............... | H04B 7/0452 370/329 |
| 2013/0294397 A1* | 11/2013 | Lee | ............... | H04B 7/063 370/329 |
| 2014/0112183 A1* | 4/2014 | Yang | ............... | H04L 1/0025 370/252 |
| 2014/0126658 A1* | 5/2014 | Li | ............... | H04L 1/0003 375/259 |
| 2014/0211703 A1* | 7/2014 | Seok | ............... | H04W 52/367 370/329 |
| 2015/0043409 A1* | 2/2015 | Choi | ............... | H04W 52/0216 370/311 |
| 2015/0372795 A1* | 12/2015 | Wu | ............... | H04L 5/0057 370/329 |
| 2015/0373758 A1* | 12/2015 | Kim | ............... | H04W 8/26 370/329 |
| 2016/0227599 A1* | 8/2016 | Lee | ............... | H04L 1/0001 |
| 2016/0262157 A1* | 9/2016 | Kim | ............... | H04L 5/0053 |
| 2016/0366254 A1* | 12/2016 | Asterjadhi | ............... | H04L 69/324 |
| 2017/0063512 A1* | 3/2017 | Wu | ............... | H04L 5/0023 |
| 2017/0079027 A1 | 3/2017 | Chun et al. | | |
| 2017/0099219 A1* | 4/2017 | Lee | ............... | H04L 69/22 |
| 2017/0214561 A1* | 7/2017 | Lee | ............... | H04L 1/00 |
| 2017/0295531 A1* | 10/2017 | Singh | ............... | H04W 76/14 |
| 2017/0338927 A1* | 11/2017 | Park | ............... | H04L 27/26 |
| 2017/0367090 A1* | 12/2017 | Lim | ............... | H04W 72/04 |
| 2018/0048503 A1* | 2/2018 | Kim | ............... | H04L 27/26 |
| 2018/0070344 A1* | 3/2018 | Lim | ............... | H04L 27/26 |
| 2018/0091347 A1* | 3/2018 | Lee | ............... | H04W 28/06 |
| 2018/0123727 A1* | 5/2018 | Yu | ............... | H04W 24/10 |
| 2018/0139699 A1* | 5/2018 | Choi | ............... | H04W 48/02 |
| 2018/0159714 A1* | 6/2018 | Lee | ............... | H04L 27/26 |
| 2018/0205584 A1* | 7/2018 | Lim | ............... | H04L 27/2608 |
| 2018/0212725 A1* | 7/2018 | Park | ............... | H04L 27/26 |
| 2019/0124638 A1* | 4/2019 | Lim | ............... | H04L 1/00 |
| 2019/0289589 A1* | 9/2019 | Lim | ............... | H04B 7/26 |

OTHER PUBLICATIONS

Stacey Robert et al, IEEE P802.11ax TM/D1.3 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Enhancements for High Efficiency WLAN, IEEE P802.11ax TM/D1.3, Jun. 2017, pp. 1-522, LAN/MAN Standards Committee of the IEEE Computer Society, IEEE, XP055506059.

Frank Hsu, MediaTek Inc., 11ax D2.0 MAC Comment Resolution for HE Link Adaptation, IEEE P802.11, Wireless LANs, LB2253, Jan. 12, 2018, pp. 1-10, XP068122793.

* cited by examiner

| B0 - B2 | B3 - B6 | B7 | B8 - B15 |
|---|---|---|---|
| NSS | HE-MCS | DCM | Reserved |
| 3 | 4 | 1 | 8 |

CONVENTIONAL LIMITED HLA CONTROL

FIG. 7

| Control ID value | Meaning | Length of the Control Information subfield (bits) | Content of the Control Information subfield |
|---|---|---|---|
| 0 | UL MU response scheduling (UMRS) | 26 | See 9.2.4.6.4.2 (US MU response scheduling (UMRS) Control) |
| 1 | Operating mode (OM) | 12 | See 9.2.4.6.4.3 (Operating Mode (OM) Control) |
| 2 | HE link adaptation (HLA) | 16 | See 9.2.4.6.4.4 (HE link adaptation (HLA) Control) |

CONVENTIONAL LIMITED HLA CONTROL

FIG. 8

CONVENTIONAL UNSOLICITED HLA MFB

| HE Link Adaptation Capable | Indicate whether the STA supports link adaptation using the HLA Control field. | If +HTC-HE support is 1:<br>Set to 0 (No feedback) if the STA dose not provide HE MFB.<br>Set to 2 (Unsolicited) if the STA provides only unsolicited HE MFB.<br>Set to 3 (Both) if the STA is capable of providing HE MFB in response to HE MRQ and if the STA provides unsolicited HE MFB.<br>The value 1 is reserved.<br>Reserved if +HTC-HE support is 0. |

FIG. 9

HLA REQUEST

| B0 | B1 | B2-B4 | B5-B8 | B9 | B10-B17 | B18-B19 | B20-B22 | B23 | B24-B25 |
|---|---|---|---|---|---|---|---|---|---|
| Unsolicited MFB | MRQ | Reserved | Reserved | Reserved | RU Allocation | BW | MSI | Reserved | Reserved |
| Bits 1 | 1 | 3 | 4 | 1 | 8 | 2 | 3 | 1 | 2 |

FIG. 10

SOLICITED HLA MFB

| B0 | B1 | B2 B4 | B5 B8 | B9 | B10 B17 | B18 B19 | B20 B22 | B23 | B24 B25 |
|---|---|---|---|---|---|---|---|---|---|
| Unsolicited MFB | MRQ | NSS | HE-MCS | DCM | Reserved | Reserved | MSI | Reserved | Reserved |
| Bits 1 | 1 | 3 | 4 | 1 | 8 | 2 | 3 | 1 | 2 |

FIG. 11

UNSOLICITED HLA MFB

| B0 | B1 | B2 B4 | B5 B8 | B9 | B10 B17 | B18 B19 | B20 B22 | B23 | B24 B25 |
|---|---|---|---|---|---|---|---|---|---|
| Unsolicited MFB | MRQ | NSS | HE-MCS | DCM | RU Allocation | BW | MSI | TxBF | Reserved |
| Bits 1 | 1 | 3 | 4 | 1 | 8 | 2 | 3 | 1 | 2 |

FIG. 12

PARTIAL PPDU PARAMETER

| B0-B1 | B2 |
|---|---|
| PPDU Format | Coding Type |
| Bits 2 | 1 |

FIG. 13

| Subfield | Meaning | Definition |
| --- | --- | --- |
| Unsolicited MFB | Unsolicited MFB indicator | Set to 1 if the HLA Control is an unsolicited MFB. Set to 0 if the HLA Control is an MRQ or a solicited MFB. |
| MRQ | HLA feedback request indicator | Set to 1 and set Unsolicited MFB subfield to 0 to request an HLA feedback. Set to 0 and set Unsolicited MFB subfield to 0 to respond an HLA request. If the Unsolicited MFB subfield is 1, the MRQ subfield is reserved. |
| NSS | Recommended number of spatial stream | If the Unsolicited MFB subfield is 1 or if the Unsolicited MFB subfield is 0 and the MRQ subfield is 0, NSS subfield indicates the recommended number of spatial streams (NSS) and is set to NSS - 1. Otherwise, this subfield is reserved. |
| HE-MCS | Recommended HE-MCS | If the Unsolicited MFB subfield is 1 or if the Unsolicited MFB subfield is 0 and the MRQ subfield is 0, the HE-MCS subfield indicates the recommended HE-MCS, and is set to the HE-MCS Index value (defined in 28.5 (Parameters for HE-MCSs)). Otherwise, this subfield is reserved. |
| DCM | Recommended usage of DCM | If the Unsolicited MFB subfield is 1 or if the Unsolicited MFB subfield is 0 and the MRQ subfield is 0, the DCM subfield indicates the recommended usage of DCM. This subfield is set to 1 if DCM is recommended and is set to 0 otherwise. Otherwise, this subfield is reserved. |

FIG. 16

| Subfield | Meaning | Definition |
|---|---|---|
| RU Allocation | RU of the recommended HE-MCS/RU specified by MFB requester to get feedback | If the Unsolicited MFB subfield is 1, the RU subfield indicates the RU for which the recommended HE-MCS applies. If the Unsolicited MFB subfield is 0 and the MRQ subfield is 1, the RU subfield indicates the RU requested by the MFB requester to get feedback. The RU Allocation subfield is interpreted with the BW subfield to specify the RU. RU index encoding is as defined Error! Reference source not found. Otherwise, this subfield is reserved. |
| BW | Bandwidth of the recommended HE-MCS/Bandwidth specified by MFB requester to get feedback | If the Unsolicited MFB subfield is 1, the BW subfield indicates the bandwidth for which the recommended HE-MCS applies. If the Unsolicited MFB subfield is 0 and the MRQ subfield is 1, the BW subfield indicates the bandwidth requested by the MFB requester to get feedback. Set to 0 for 20 MHz, Set to 1 for 40 MHz, Set to 2 for 80 MHz, and Set to 3 for 160 MHz or 80+80 MHz. Otherwise, this subfield is reserved. |
| MSI/Partial PPDU Parameters | Partial parameters of the measured PPDU/MRQ sequence identifier | If the Unsolicited MFB subfield is 0 and the MRQ subfield is 1, the MSI/Partial PPDU Parameters subfield contains a sequence number in the range 0 to 6 that identifies the specific MCS feedback request. If the Unsolicited MFB subfield is 0 and the MRQ subfield is 0, the MSI/Partial PPDU Parameters subfield contains a sequence number in the range 0 to 6 that responds to the specific solicited MCS feedback request. If the Unsolicited MFB subfield is 1, the MSI/Partial PPDU Parameters subfield contains the PPDU Format and Coding Type subfields as shown in Error! Reference source not found. |
| Tx BF | Transmission type of the measured PPDU | If the Unsolicited MFB subfield is 1, then the Tx BF subfield indicates whether or not the PPDU from which the unsolicited MFB was estimated is beamformed. Set to 0 for non-beamformed PPDU. Set to 1 for beamformed PPDU. Otherwise, this subfield is reserved. |

| Link Characteristic | Resource Unit Allocation | NSS | DCM Dual Subcarrier Modulaion |
|---|---|---|---|
| BW 20 Mhz | RU4 | 3 | Yes |
| BW 40 Mhz | RU15 | 2 | No |

| Link Characteristic | Resource Unit Allocation | Modulation/Coding |
|---|---|---|
| BW 20 Mhz | RU5 | BCC_CODING |
| BW 40 Mhz | RU14 | LDPC_CODING |

FIG. 20

NETWORK COMMUNICATION LINK ADAPTATION SYSTEMS AND METHODS

CROSS-REFERENCE TO RELATED APPLICATIONS

This application claims benefit of and priority to U.S. Provisional Patent Application No. 62/522,146, entitled "High Efficiency (HE) WLAN Link Adaptation", filed on Jun. 20, 2017, which is incorporated herein by reference.

FIELD OF THE INVENTION

Embodiments of the present invention relate to the field of network communications. In one embodiment, systems and methods facilitate efficient communication links in a local area network environment.

BACKGROUND

Numerous electronic technologies such as digital computers, video equipment, and telephone systems are used to increase productivity and reduce costs in processing information in most areas of business, science, and entertainment. The electronic systems often utilize a number of methods to convey information including audio, video, graphics, and so on. Accurate and clear communications of information are typically important for proper processing and utilization of the information. However, there are a number of factors that can impact accurate communications of information, including lack of coordination among diverse communication components in a communication network.

One approach to communication coordination is to utilize standardized protocols to facilitate interoperability of diverse network components. Traditional approaches often organize and format information in accordance with a protocol based on communication functions of the network system. Some conventional communication protocols include multiple layers organized in a hierarchy in which a lower layer serves the one above it (e.g., Open System Interconnection (OSI) model, IEEE 802.11 compliant model, etc.). The model and protocol can include a physical layer and a data link layer. The physical layer sets out the electrical and physical coupling specifications between a communication network hardware device and a transmission medium. The physical layer is typically below the data link layer in the hierarchy. The data link layer is directed at network node-to-node information transfer, including defining a protocol for flow control between node devices and defining a protocol to establish and terminate communication connections. Communication networks compliant with IEEE 802 standards such as 802.3 Ethernet, 802.11 Wi-Fi and 802.15.4 ZigBee operate at the data link layer.

Some traditional approaches divide the data link layer into a medium access control (MAC) layer and a logical link control (LLC) layer. The LLC layer is responsible for controlling error checking, frame synchronization, and network layer protocol identification. The MAC layer controls how devices in a network gain access to a medium and permission to transmit data. One aspect of media access control is link adaptation in which modulation, coding, and other signal parameters are matched to features, characteristics, and conditions on a communication link. However, traditional link adaptation is often limited and does not adequately address the complexities of network link conditions and demand for improved network communication performance.

SUMMARY

Presented systems and methods facilitate efficient and effective communication link adaptation. In one embodiment, a system comprises: a first communication device configured to forward link adaptation information, and a second communication component configured to receive the link adaptation information. The system can be implemented as part of a wireless local area network (WLAN). The link adaptation information can include Modulation and Coding Scheme (MCS) Feed Back (MFB) related information in a communication frame. The communication frame can include a first field and a second field. The first field indicates the information is being forwarded as unsolicited MFB information or is associated with a solicitation request for the MFB information. The second field indicates whether the information is MFB information or a request for MFB information.

The link adaptation information can be high efficiency link adaptation (HLA) related information. In one embodiment, the first field is called an unsolicited MFB field comprising one bit, wherein when the bit is a logical 1 the field indicates a frame comprises unsolicited MFB information and when the when the bit is a logical 0 the field indicates a frame comprises MFB information associated with a request. The second field can be called a MRQ field comprises one bit, wherein when the bit is a logical 1 the frame comprises a request for MFB information and when the bit is a logical 0 the frame comprises solicited MFB information in response to the request.

In one embodiment, the link adaptation information can be a request for the MFB feedback information, a solicited response for the MFB feedback information, or an unsolicited forwarding of MFB feedback information. A request for the MFB feedback information can include: a field comprising an indication of a resource unit (RU) that initiated the request for the MFB information, a field comprising an indication of bandwidth (BW) the MFB applies, and a field comprising an indication of a MRQ sequence identifier (MSI). In one embodiment, the field comprising an indication of a MRQ sequence identifier is shared with a partial PPDU parameter subfield comprising two bits that indicate a format of a PPDU under estimation and one bit that indicates a coding type of the PPDU under estimation.

A solicited response for the MFB feedback information can include: a field comprising an indication of a recommended Number of Spatial Streams (NSS), a field comprising an indication of a recommended HE MCS, a field comprising an indication whether HE MCS is Dual Carrier Modulation (DCM), and a field comprising an indication of a MRQ sequence identifier (MSI). An unsolicited forwarding of MFB feedback information can include: a field comprising an indication of a recommended NSS, a field comprising an indication of a recommended HE MCS, a field comprising an indication whether HE MCS is DCM, a field comprising an indication of a resource unit (RU) that MFB recommended, a field comprising an indication of bandwidth the MFB applies or utilizes, a field comprising an indication of partial parameters of PPDU under estimation, and a field comprising an indication if the PPDU under consideration is beamformed. A field comprising an indication if the PPDU under consideration is beamformed can be shared with a field comprising an indication of a MRQ sequence identifier (MSI).

In one embodiment, a communication method comprises: performing a link adaptation process, including receiving link adaptation information in a communication frame; and communicating information via the communication link in accordance with the link adaptation information. A communication frame can include: a first field set of bits that identify whether the MFB information is associated with a solicited request for feedback, and a second field to indicate whether the information is being forwarded as unsolicited MFB information or as a response to a solicitation request for the MFB information. The communication link can be a wireless link and the link adaptation information can be related to Modulation and Coding Scheme (MCS) Feed Back (MFB) information. Communicating the information can include modulating communication link signals in accordance with the link adaptation information. Communicating the information can include coding communication link signals in accordance with the link adaptation information. The communication link can be IEEE 802.11 compatible.

In one embodiment, a communication station, comprises: a processing circuit operable to generate Modulation and Coding Scheme (MCS) Feed Back (MFB) information, a transmitter to transmit the MFB information to another station on a communication link; and a receiver to receive signals from the other station on the communication link, wherein the signals are configured in accordance with the MFB information. The MFB information can include a field to indicate a modulation and coding scheme MCS request (MRQ) sequence identifier (MSI) information when the MFB information is in response to a solicitation request for link adaptation information and partial Physical Layer Convergence Procedure (PLCP) Protocol Data Unit (PPDU) information when the MFB information is unsolicited. In one exemplary implementation, a link adaptation requesting component is operable to request MFB information by a trigger frame (TF) that includes HLA request information. The MFB can include resource unit (RU) allocation information. The PPDU can selectively include information from a set of parameters associated with high a efficiency single user (HE_SU) configuration, a high efficiency multiple user (HE_MU) configuration, a high efficiency High Efficiency extended range (HE_EXT) configuration, and a high efficiency trigger (HE_TRIG) configuration.

Unsolicited MFB information can be forwarded during regular fame exchange. The high efficiency link adaptation (HLA) MFB information includes a bit in an unsolicited MFB field and a bit in a MRQ field to identify a selection of one of three types of link adaptation control. The three types of link adaptation control can include: a HLA MFB request control type operable to request MFB information, a solicited HLA MFB control type operable to respond to a MFB request, and an unsolicited HLA MFB control type operable to respond to sounding and forward LA information during regular frame exchange. In one exemplary implementation, a station collects multiple link quality data by TF+HLA and UL TRIG PPDU.

BRIEF DESCRIPTION OF THE DRAWINGS

The accompanying drawings together with the description are incorporated in and form a part of this specification. They illustrate exemplary embodiments and explain exemplary principles of the disclosure. They are not intended to limit the present invention to the particular implementations illustrated therein. The drawings are not to scale unless otherwise specifically indicated

FIG. 7 is a block diagram of conventional control information subfield format when a Control ID subfield is 2.

FIG. 8 is a table of conventional Control ID subfield values.

FIG. 9 is a block diagram of conventional HE MAC capabilities information field format.

FIG. 10 is a block diagram of an exemplary HLA request configuration in accordance with one embodiment.

FIG. 11 is a block diagram of exemplary solicited HLA MFB configuration in accordance with one embodiment.

FIG. 12 is a block diagram of exemplary unsolicited HLA MFB configuration in accordance with one embodiment.

FIG. 13 is a block diagram of exemplary partial PPDU parameters configuration in accordance with one embodiment.

FIG. 16 is a table of exemplary HLA control fields and in accordance with one embodiment.

FIG. 17 is a table of exemplary HLA control fields and in accordance with one embodiment.

FIG. 19 is a block diagram of an exemplary table mapping link characteristics to modulation and coding schemes in accordance with one embodiment.

FIG. 20 is a block diagram of another exemplary table mapping link characteristics to modulation and coding schemes in accordance with one embodiment.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinarily skilled in the art that the present invention may be practiced without these specific details. In other instances, well known methods, procedures, components, and circuits have not been described in detail as not to unnecessarily obscure aspects of the current invention.

System and method embodiments of the present invention facilitate efficient and effective communications via a network. The systems and methods include protocols and procedures that facilitate efficient and effective accommodation of complex communication concerns. Characteristics, features, and conditions of communication links are some of the most important aspects of a network and can have a significant impact on communication performance. The presented communication systems and methods can flexibly facilitate robust adaptation of modulation, coding, and other communication parameters associated with a communication link, allowing improved communication link operation and performance. In one embodiment, the systems and methods are included in a wireless local area network (WLAN). It is appreciated that WLANs can come in a variety of configurations.

Figure 1:
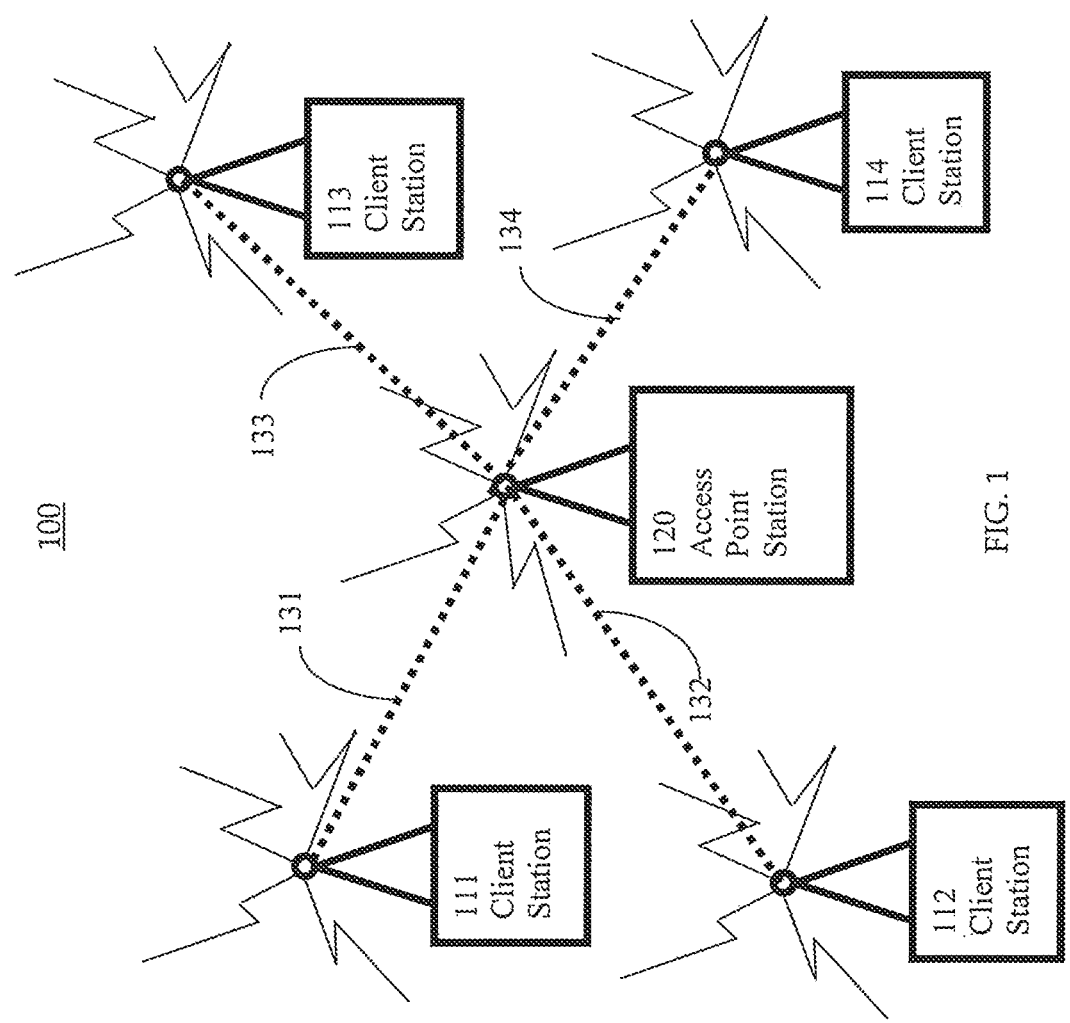
FIG. 1 is a block diagram of an exemplary wireless local area network in accordance with one embodiment.

FIG. 1 is a block diagram of wireless local area network 100 in accordance with one embodiment. Wireless local area network 100 includes access point station 120 and client stations 111, 112, 113, and 114. In one embodiment, wireless communications links 131, 132, 133, and 134 can be established between access point station 120 and client stations 111, 112, 113, and 114, respectively. In one embodiment, an access point station can be a base station for the WLAN. Access point stations can include a wireless router, a wireless bridge, and so on. Client stations can include computers, tablets, cell phones, and so on. In one exemplary implementation, access point stations and client stations are Wi-Fi compatible. In one exemplary implementation, access point stations and client stations are IEEE802.11 compatible.

Figure 2:
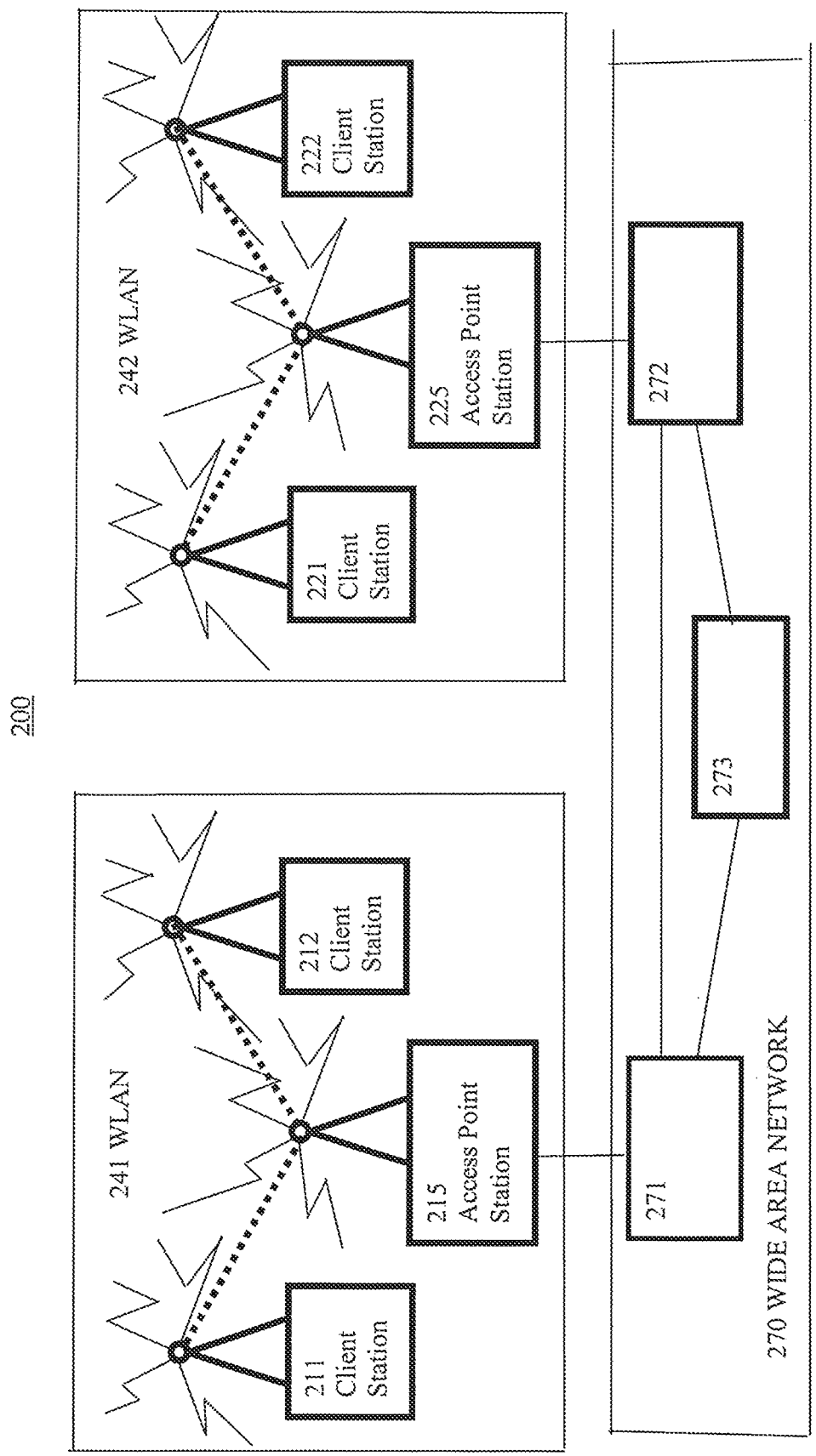
FIG. 2 is a block diagram of an exemplary communication network in which a WLAN is communicatively coupled to other communication components in accordance with one embodiment.

FIG. 2 is a block diagram of an exemplary communication network 200 in which a WLAN is communicatively coupled to other communication components in accordance with one embodiment. Communication system 200 includes WLAN 241, WLAN 242, and Wide Area Network (WAN) 270. WLAN 241 includes access point station 215 and client stations 211 and 212. Client stations 211 and 212 can be communicatively coupled to access point station 215. WLAN 242 includes access point station 225 and client stations 221 and 212. Client stations 221 and 222 can be communicatively coupled to access point station 225. WAN 270 includes components 271, 272, and 273 which can be communicatively coupled to each other. Access point station 215 can be communicatively coupled to component 271 and access point station 225 can be communicatively coupled to component 272. WAN 270 can be considered a wide area network backbone.

Figure 3:
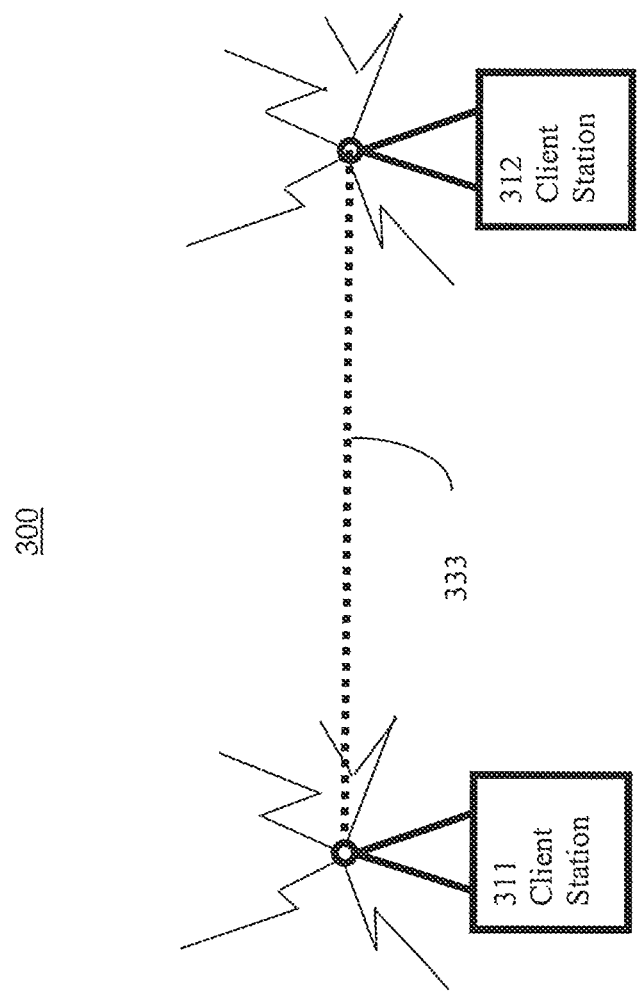
FIG. 3 is a block diagram of an exemplary wireless local area network (WLAN) 300 in accordance with one embodiment.

FIG. 3 is a block diagram of wireless local area network (WLAN) 300 in accordance with one embodiment. Wireless local area network 300 includes client stations 311 and 312 and can be communicatively coupled via communication link 333. In one embodiment, WLAN 300 is an ad hoc network in a peer to peer (P2P) configuration in which wireless device client stations 311 and 312 can communicate directly with each other. In one embodiment, wireless devices within range of each other can discover and communicate directly without involving intermediate dedicated central access points. In one exemplary implementation, an Independent Basic Service Set (IBSS) is utilized. In one embodiment, WLAN 200 is a Wi-Fi P2P compatible network in which one of the device stations is considered a group owner that operates as an access point and the other device stations are clients.

Figure 4:
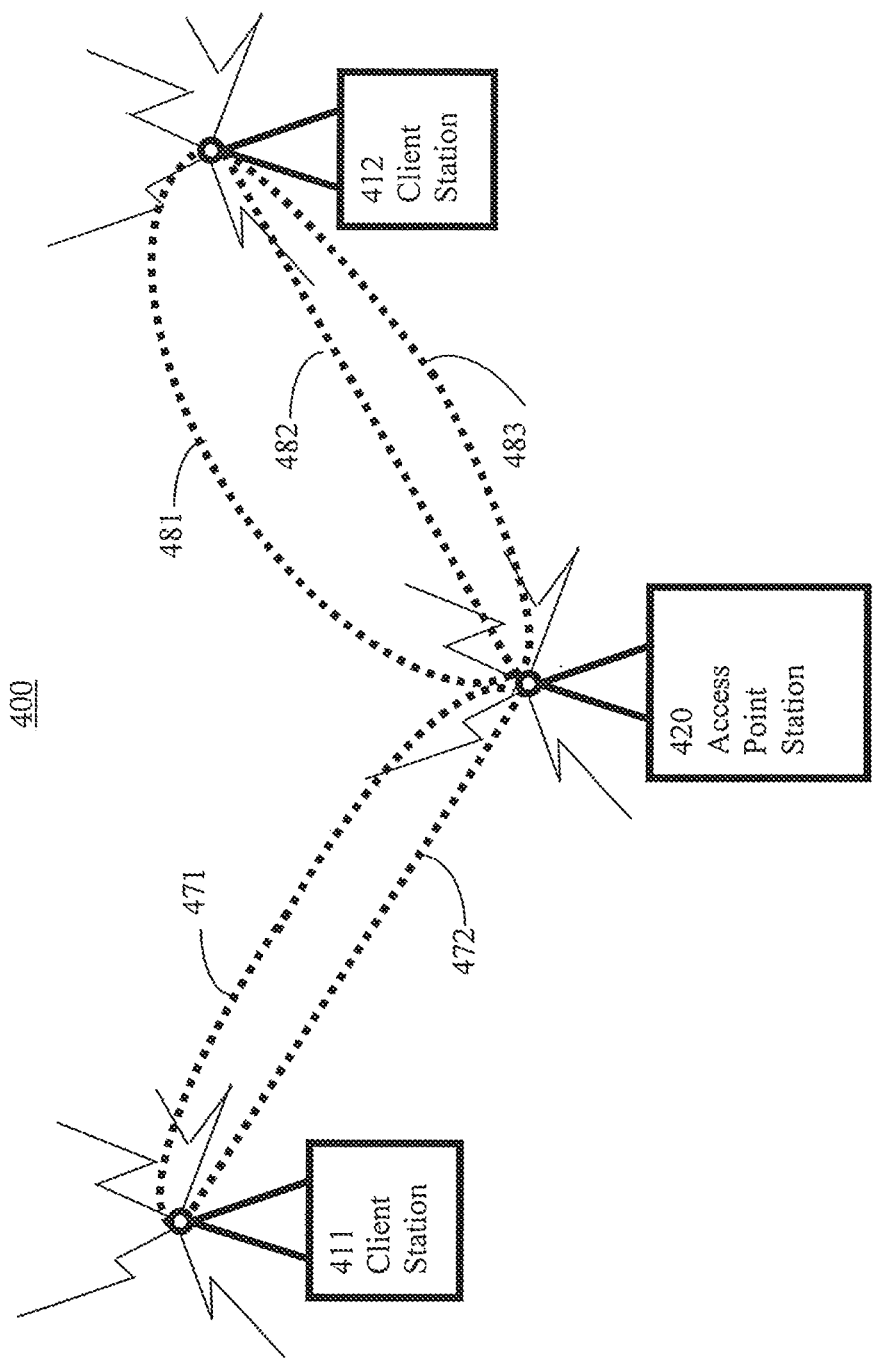
FIG. 4 is a block diagram of an exemplary communication network with multiple communication links between components in accordance with one embodiment.

FIG. 4 is a block diagram of an exemplary communication network 400 with multiple communication links between components in accordance with one embodiment. Communication network 400 includes access point station 420 and client stations 411 and 412. Client station 411 can be communicatively coupled to access point station 420 via a plurality of communication links, including communication links 471 and 472. Client station 412 can be communicatively coupled to access point station 420 via a plurality of communication links, including communication links 481, 482, and 483. The communication links can have different features, characteristics and conditions that are mapped to different modulation, coding and other parameters for a respective communication link via link adaptation information.

Communications on a wireless communication link (e.g., a radio signal, electromagnetic signal, etc.) between components (e.g., client stations, access point stations, etc.) can be impacted by various factors and conditions. Conditions on the wireless link can include path loss, interference due to signals coming from other transmitters, the sensitivity of the receiver, the available transmitter power margin, and so on. Link adaptation (LA) or adaptive coding and modulation (ACM) in wireless communications is used to match modulation, coding, and other signal parameters to the features, characteristics, and conditions on a wireless link. The bit rate and robustness of data transmission can be impacted by the quality of the radio signal or channel. In one embodiment, a modulation and coding scheme can be adapted or modified accordingly based on the quality of the radio signal or channel. Link information utilization by a transmitter can typically enable enhanced performance over systems that do not include link adaptation. Some adaptive modulation systems include channel state information at the transmitter. Link features, characteristics, and condition information can be acquired in a variety of ways (e.g., solicit a request, non solicited request, etc.).

In one embodiment, information is communicated in data units (e.g., packets, frames, groups, sets, etc.) of information. The data units can comprise a designated size or number of bits. In one embodiment, a protocol compliant data unit (PDU) is utilized to communicate information that is transmitted as a single unit among entities at a protocol hierarchical peer level of a computer network. A PDU may contain network address indications (e.g., source, destination, etc.) and user data or control information.

It is appreciated that PDUs can be utilized to communicate various types of information. In one embodiment, a PDU can include both basic payload information and network control information. Communication packets can include PDUs with a basic or primary payload directed to information a user wants to communicate from one client station to another client station (e.g., a document, an image, a video, other data, etc.). In one embodiment, a station sending or forwarding a PDU with basic payload information is considered a transmitter station and a station receiving the basic communication is considered a receiver client station.

Communication packets can include PDUs with a payload directed to network control information (e.g., modulation information, coding information, etc.). In one embodiment, a station sending or forwarding a PDU that includes a request for network control information is considered a requester and a station sending or forwarding network control information (e.g., MFB, etc.) is considered a responding client station. A responding station can forward network control information in response to a number of things (e.g., a change in network condition, a periodic trigger or time, a request for information, etc.). In one embodiment, a response to a request from another station is considered a solicited response and a response to other things is considered an unsolicited response. In one embodiment, a transmitter of base communication information can be considered a requester of network control information. The transmitter of base communication information can be configured to receive network control information. In one embodiment, a receiver of base communication information can be considered a sender or transmitter of network control information.

In one embodiment, particular portions or sections of information in a PDU can be configured or organized in accordance with various fields. In one embodiment, media access control (MAC) information is utilized in the management of network link communication operations. It is appreciated MAC information can be communicated in a variety of ways, including in a PDU. The PDU can be compatible with data convergence characteristics. In one embodiment, the PDU is a physical layer convergence procedure (PLCP) protocol data unit (PPDU). In one exemplary implementation, a PLCP is utilized to minimize the dependence of the MAC layer on the physical medium dependent (PMD) layer by mapping MAC protocol data units (MPDUs) into a frame format suitable for transmission by the PMD. The PLCP can also map incoming frames from the PMD layer or wireless medium to the MAC layer.

Figure 5:
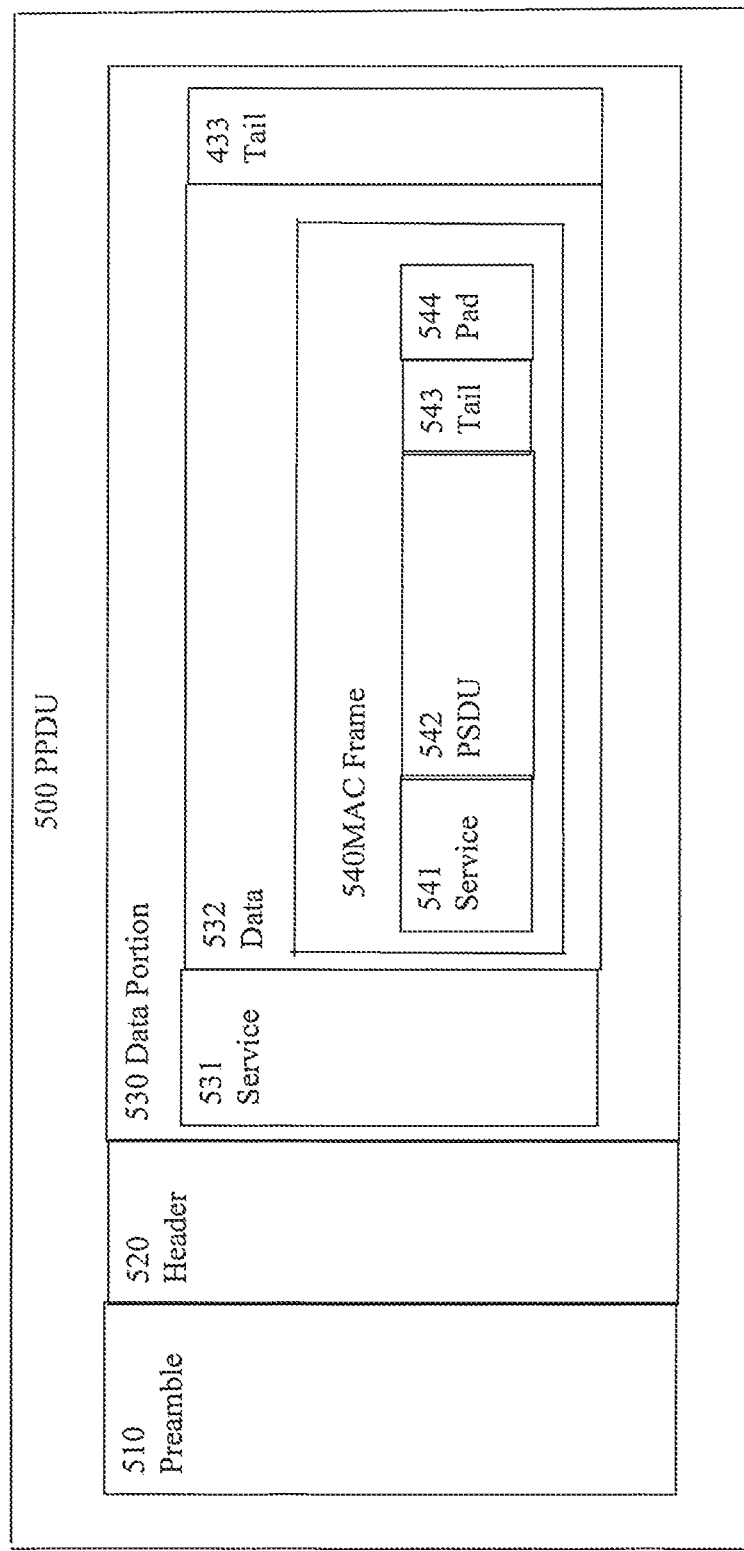
FIG. 5 is a block diagram of an exemplary PPDU in accordance with one embodiment.

FIG. 5 is a block diagram of an exemplary PPDU 500 in accordance with one embodiment. PPDU 500 includes a preamble portion 510, header portion 520, and a data portion 530. The preamble portion 510 can include format specific training and signaling fields. The header portion 520 can include destination, and source information. The data portion can include PLCP information. In one embodiment, the data portion 530 includes service field 531, data field 532, and tail 533 field. In one embodiment, data field 532 is a high throughput data field. Data field 532 includes a MAC frame 540 which includes a service field 541, PSDU field 542, tail field 543, and optional padding bits 544.

In one embodiment, data field 532 is a high throughput (HT) data field which include service field 541 that initializes a data scrambler, includes PLCP service data unit (PSDU) information (which can include an aggregation of several MAC service data units), tail field 543 can include bits to terminate a convolutional code, and optional padding field 544 can include padding bits (e.g., to ensure the HT data field comprises an integer number of symbols, etc.). In one embodiment, the PSDU is also called the MPDU. In one embodiment, a PSDU or MPDU includes link adaptation information.

Figure 6:
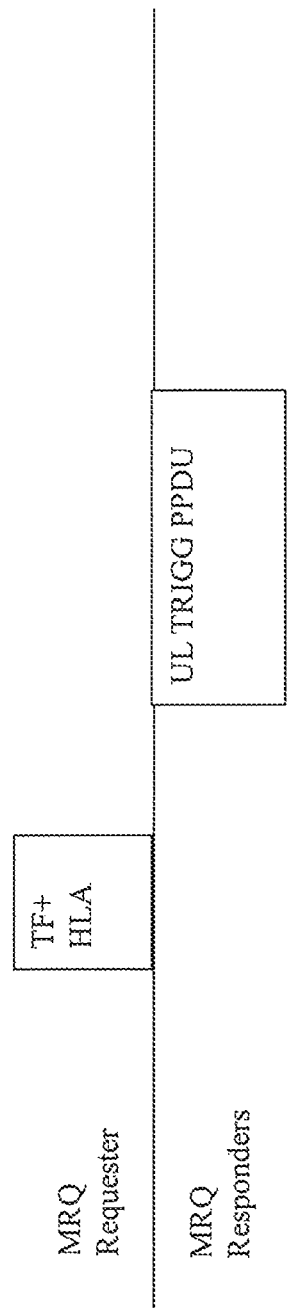
FIG. 6 is a block diagram of an exemplary multi-user (MU) UL link quality acquisition in accordance with one embodiment.

In one embodiment, network communications are compatible with a multiple-user multiple-input multiple-output (MU-MIMO) configuration. In one exemplary implementation, a network station can collect multiple link quality data by issuing or forwarding a trigger frame (TF) with a high efficacy link adaptation (HLA) information request and another station can respond in an uplink (UL) trigger (TRIG) frame with PPDU information. In one embodiment, multiple stations can respond to a HLA request at substantially the same time. These stations can issue an UL TRIG PPDU to respond to the TF. In one exemplary implementation, a UL TRIG PPDU can include several RUs and each RU can be from an individual station. FIG. 6 is a block diagram of a multi-user (MU) UL link quality acquisition in accordance with one embodiment. Link adaptation can enable fast link quality acquisition among multiple stations (STAs). The link adaptation information exchange can enable increased performance due to support for more link adaptation information details than conventional approaches.

Some conventional approaches have only minimum subfields for link adaptation. FIG. 7 is a block diagram of conventional control information subfield format with a Control ID subfield value is 2. FIG. 8 is a table of conventional Control ID subfield values. One conventional approach defines the HE Link adaptation capable subfield in the HE MAC capability information filed and is limited to two bits to indicate HLA capabilities. FIG. 9 is a block diagram of conventional HE MAC capabilities information field format. The conventional approaches typically lack details on communication link features and characteristics, unlike the embodiments of the present invention which systems and methods facilitate robust link adaptation.

In one embodiment, the wireless communication link is established based upon a link adaptation process in which high efficiency link adaptation (HLA) MFB information is utilized. The HLA MFB information can include Orthogonal Frequency Division Multiple Access (OFDMA) Resource Unit (RU) information, Dual Carrier Modulation (DCM), and different PPDU formats. In one embodiment, an MFB requester is operable to request MFB information, multiple link quality acquisition by MU UL PPDU and a specific RU and BW. In one embodiment, a MFB responder is operable to handle the MFB request, send unsolicited MFB in response to sounding, and send unsolicited MFB during regular fame exchange. The different PPDU formats can include high efficiency HE_SU, HE_MU, HE_EXT, HE_T-RIG. The high efficiency link adaptation (HLA) MFB information can include a bit in an unsolicited MFB field and a bit in a MRQ field to identify a selection of one of three types of link adaptation control. The three types of link adaptation control can include: an HLA MFB request control type operable to request MFB information, a solicited HLA MFB control type operable to respond to an MFB request, and an unsolicited HLA MFB control type operable to respond to sounding and forward LA information during regular frame exchange.

FIG. 10 is a block diagram of an exemplary HLA request configuration in accordance with one embodiment. The request information includes 26 bits identified as bits B0 through B25. An unsolicited MFB indication field corresponds to bit B0 and indicates if the communication frame is associated with HLA request that is unsolicited from another station in the network. In one embodiment, when bit B0 is a logical 0 the communication frame is associated with a solicited request for MFB information. An MRQ indication field corresponds to bit B1 and indicates if the communication frame includes MFB information or is a request for MFB information. In one embodiment, when bit B1 is a logical 1 the communication frame is associated with a HLA request. An RU Allocation field corresponds to bits B10 through B17 and indicates the RU that is requesting the HLA information. A BW field corresponds to bits B18 through B19 and indicates the BW that is requesting the HLA information. An MSI field corresponds to bits B20 through B22 and indicates an MRQ sequence identifier. Bits B2 through B9 and bits B23 through B25 are reserved.

FIG. 11 is a block diagram of exemplary solicited HLA MFB configuration in accordance with one embodiment. The solicited HLA MFB information includes 26 bits identified as bits B0 through B25. An unsolicited MFB indication field corresponds to bit B0 and indicates if the communication frame is associated with an HLA request that is unsolicited from another station in the network. In one embodiment, when bit B0 is a logical 0, the communication frame is associated with solicited HLA MFB information. An MRQ indication field corresponds to bit B1 and indicates if the communication frame includes MFB information or is a request for MFB information. In one embodiment, when bit B1 is a logical 0, the communication frame is response to an HLA request and the communication frame includes solicited MFB information. An NSS indication field corresponds to bits B2-B4 and indicates a recommended NSS. An HE-MCS indication field corresponds to bits B5-B8 and indicates a recommended HE-MCS. A DCM indication field corresponds to bit B9 and indicates if an HE MCS is DCM. An MSI field corresponds to bits B20 through B22 and indicates an MRQ sequence identifier.

FIG. 12 is a block diagram of exemplary unsolicited HLA MFB configuration in accordance with one embodiment. The unsolicited HLA MFB information includes 26 bits identified as bits B0 through B25. An unsolicited MFB indication field corresponds to bit B0 and indicates if the communication frame is associated with an HLA request that is unsolicited from another station in the network. In one embodiment, when bit B0 is a logical 1, the communication frame is associated with unsolicited HLA MFB information. An MRQ indication field corresponds to bit B1 and indicates if the communication frame includes MFB information or is a request for MFB information.

In one embodiment, when bit B1 is a logical 0, the communication frame includes unsolicited MFB information. An NSS indication field corresponds to bits B2-B4 and indicates a recommended NSS. An HE-MCS indication field corresponds to bits B5-B8 and indicates a recommended HE-MCS. A DCM indication field corresponds to bit B9 and indicates if an HE MCS is DCM. An RU Allocation field corresponds to bits B10 through B17 and indicates the particular RU which the MFB recommended. A BW field corresponds to bits B18 through B19 and indicates the BW the MFB that are recommended. A partial PPDU parameters field corresponds to bits B20 through B22 and indicates partial parameters of PPDU under estimation. A TxBF field corresponds to bit B23 and indicates if a PPDU under estimation is beamformed. Bits B24 through B25 are reserved.

FIG. 13 is a block diagram of exemplary partial PPDU parameters configuration in accordance with one embodiment. The partial PPDU parameters configuration includes 3 bits identified as bits B0 through B2. A PPDU format indication field corresponds to bits B0 through B1 and indicates the format of PPDU under estimation. A coding type field corresponds to bit B2 and indicates the coding type of PPDU under consideration. In one embodiment, partial PPDU parameters configuration is paired with an MSI field configuration.

Figure 14:
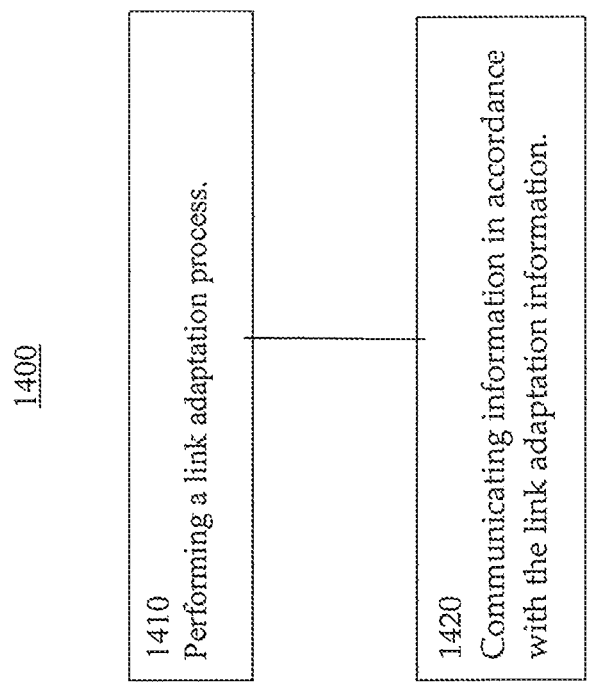
FIG. 14 is a flow chart of a link adaptation method in accordance with one embodiment.

FIG. 14 is a flow chart of an exemplary link adaptation method in accordance with one embodiment. The link adaptation method can be implemented on a communication network in which the communication link can be a wireless link. The communication can be link IEEE 802.11 compatible, in one embodiment.

In block 1410, a link adaptation process is performed. In one embodiment, the link adaptation process includes receiving link adaptation information in a communication frame. The communication frame can include a first field set of bits that identify whether the MFB information is associated with a solicited request for feedback, and a second field to indicate whether the information is being forwarded as unsolicited MFB information or as a response to a solicitation request for the MFB information.

In block 1420, information is communicated via the communication link in accordance with the link adaptation information. In one embodiment, the link adaptation information is related to Modulation and Coding Scheme (MCS) Feed Back (MFB) information and the adaptation or modification to the communications on the link are made in accordance with the link adaptation information. In one exemplary implementation, communicating information includes modulating communication link signals (e.g., frequency modulation, amplitude modulation, OFDM modulation, etc.) in accordance with the link adaptation information. Communicating information can include coding communication link signals (e.g., adding patterns of redundancy in the transmission path, convolutional coding, etc.) in accordance with the link adaptation information.

Figure 15:
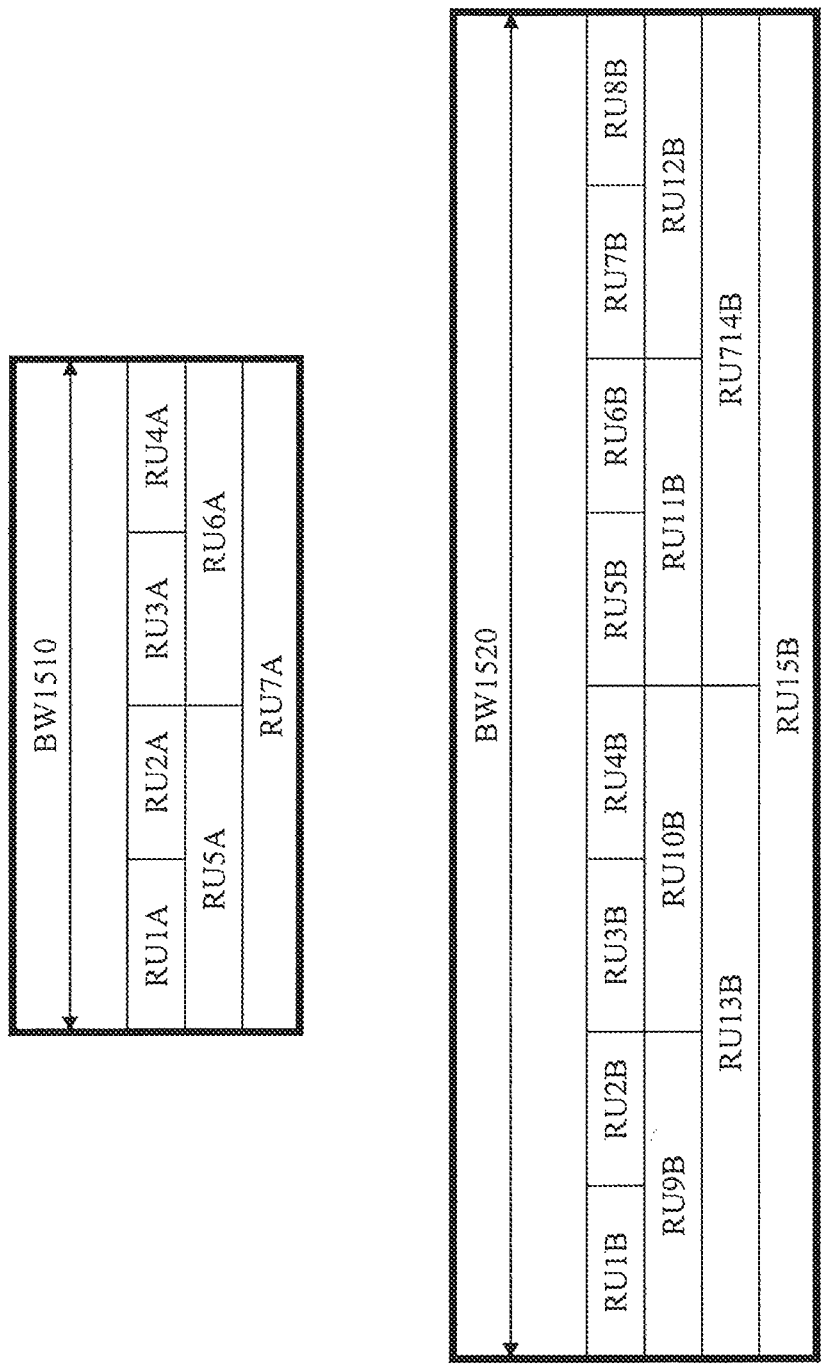
FIG. 15 is a block diagram of exemplary bandwidth and resource unit allocations or associations in accordance with one embodiment.

It is appreciated the presented systems and methods are compatible with various bandwidths (BWs) and allocation of resource unit combinations. FIG. 15 is a block diagram of exemplary bandwidth and resource unit allocations or associations in accordance with one embodiment. Bandwidth 1510 is associated with RU1A through RU7A and bandwidth 1520 is associated with RU1B through RU 15B. In one embodiment, bandwidth 1510 is in a 20 MHz bandwidth range and bandwidth 1520 is in a 40 MHz range. Various combinations of RUs can be utilized to fill up the available bandwidth. In one exemplary implementation, a first combination of RU1A, RU2A, RU3A and RU4A, a second combination of RU5A, RU3A and RU4A, a third combination of RU1A, RU2A and RU 6A, a forth combination of RU5A and RUGA, or RU7A can be used to fill up bandwidth 1510. In one embodiment, BW fields and RU fields in a PDU are used to indicate or specify where the recommended HE-MCS applies. The indication can be an index indication.

In one embodiment, a link adaptation uses an HLA Control subfield. The link adaptation can apply to frame exchange sequences that include PPDUs containing an HE variant HT Control field. In one exemplary implementation, if the Control ID subfield in a Control subfield in an A-Control subfield is 2, the Control Information subfield in the Control subfield contains information related to the HE link adaptation (HLA) procedure. In one embodiment, the control information subfields are similar to the fields of FIG. 10. FIGS. 16 and 17 are a table of exemplary HLA control fields and in accordance with one embodiment. An HE station sets the HE Link Adaptation Support subfield in a HE Capabilities Information field of the HE Capabilities element it transmits to. In one exemplary implementation, HE Link Adaptation Support subfield is set to the value of 11HEMCSFeedbackOptionImplemented.

In one embodiment, a station that supports HE link adaptation using the HLA Control subfield sets the HE Link Adaptation Support subfield in the HE Capabilities Information field in the HE Capabilities element to 2 or 3, depending on its own link adaptation feedback capability. A station does not send an MRQ to a station that has not set the HE Link Adaptation Support subfield to 3 in the HE Capabilities Information field of the HE Capabilities element. A station does not send an unsolicited MFB in any frame that contains an HLA Control subfield to a station that has not set the HE Link Adaptation Support subfield to either 2 or 3 in the HE Capabilities Information field of the HE Capabilities element.

In one embodiment, an MFB requester sets the MRQ subfield to 1 and Unsolicited MFB subfield to 0 in the HLA Control subfield of a frame to request a station to provide link adaptation feedback. In each request, the MFB requester sets the MSI field to a value ranging from 0 to 6. For the MFB requester, choosing the MSI value is implementation dependent. The appearance of more than one instance of an HLA Control subfield with the MRQ field equal to 1 within a single PPDU is interpreted by the receiver as a single request for link adaptation feedback. The MFB requester can specify the RU index and BW requesting the link adaptation feedback.

In one embodiment, on receipt of an HLA Control subfield with the MRQ subfield equal to 1, an MFB responder computes the HE-MCS, NSS, and DCM of the RU and BW specified in the MRQ and these estimates are based on the same RU of the PPDU carrying the MRQ. The PPDU carrying an MRQ can include the RU requested for MFB. The MFB responder labels the result of this computation with the MSI value from the HLA Control subfield in the received frame carrying the MRQ. The MFB responder may include the received MSI value in the MSI field of the corresponding response frame. In the case of a delayed response, this allows the MFB requester to associate the MFB with the soliciting MRQ.

In one embodiment, an MFB responder that sends a solicited MFB shall set the Unsolicited MFB subfield to 0 and MRQ subfield to 0 in the HLA Control subfield. The station receiving MFB may use the received MFB to compute the appropriate HE-MCS, DCM and NSS. An MFB responder can send a solicited response frame with various combinations of HE-MCS, NSS, and MSI. In one embodiment, when HE-MCS is 15, NSS is 7, and MSI is 0 through 6, the responder does not provide feedback for the request that had the MSI value. In one embodiment, HE-when MCS is a valid value, NSS is a valid value, and MSI is 0 through 6, the responder provides feedback for the request that had the MSI value. The MSI value in the response frame matches the MSI value of the MRQ request.

In one embodiment, a station sending unsolicited MFB information using the HLA Control subfield sets the Unsolicited MFB subfield to 1. Unsolicited HE-MCS, NSS, DCM, BW, and RU estimates reported of an HLA Control subfield sent by a station are computed based on the most recent PPDU received by the station whose PPDU format, Tx BF, and Coding Type, are indicated in the subfields of the same HLA Control subfield.

In one embodiment, in an unsolicited MFB response the PPDU Formats, Coding Type, and Tx BF subfields are set according to the receive vector (RXVECTOR) parameters of the received PPDU. The HE-MCS, RU, BW, and NSS are estimated from the received PPDU. The PPDU format subfield is set and encoded to 0 if the parameter FORMAT is equal to HE_SU, 1 if the parameter FORMAT is equal to HE_MU, 2 if the parameter FORMAT is equal to HE_ER_SU; 3 if the parameter FORMAT is equal to HE_TB. The Coding Type subfield is set to 0 if the parameter FEC_CODING is equal to BCC_CODING and set to 1 if equal to LDPC_CODING. The Tx BF subfield is set to 1 if the parameter BEAMFORMED is equal to 1 and set to 0 if equal to 0. The BW subfield indicates a bandwidth less than or equal to the bandwidth indicated by the channel bandwidth parameter (CH_BANDWIDTH). The RU subfield cooperates with the BW subfield to indicate the RU at which the recommended HE-MCS locates. The recommended RU can be within an RU in which the measured HE PPDU is located.

For either a solicited or an unsolicited response, the recommended HE-MCS and NSS subfields of HLA Control subfield are selected from the HE-MCS and NSS set supported by the recipient station. The HE-MCS subfield of HLA Control subfield is the recommended data rate, for given transmission properties carried in the RXVECTOR of the PPDU used for MFB estimation, which results in an estimated frame error rate of 10% or lower for an MPDU length of 3895 octets. In one embodiment, a HE PPDU might not be able to carry 3895 octets due to PPDU duration limitations.

In one embodiment, when a MFB requester sets the MRQ subfield to 1 and sets the MSI subfield to a value that matches the MSI subfield value of a previous request for which the responder has not yet provided feedback, the responder discards or abandons the computation for the MRQ that corresponds to the previous use of that MSI subfield value and station a new computation based on the new request. A station may respond immediately to a current request for MFB with a frame containing an MSI field value and NSS, HE-MCS, and DCM subfields that correspond to a request that precedes the current request.

Figure 18:
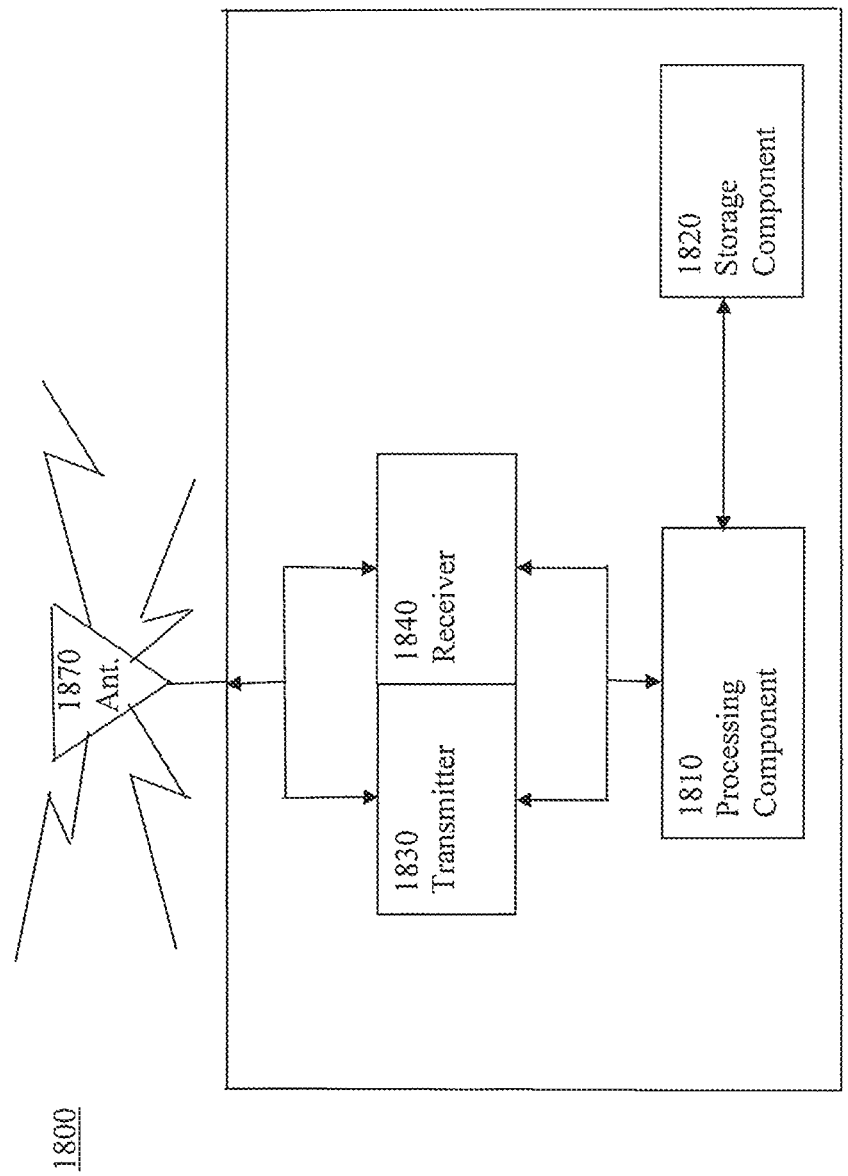
FIG. 18 is a block diagram of an exemplary station in accordance with one embodiment.

FIG. 18 is a block diagram of an exemplary station 1800 in accordance with one embodiment. Station 1800 includes processing component or circuit 1810, storage component or circuit 1820, transmitter 1830, receiver 1840, and antenna 1870. Processing component 1810 is communicatively coupled to storage component 1820, transmitter 1830, and receiver 1840. Transmitter 1830 and receiver 1840 are communicatively coupled to antenna 1870. Processing component or circuit 1810 is configurable to perform communication processes, including link adaptation related processes. It is appreciated that processing component 1820 can be implemented in a variety of devices (e.g., processor, field programmable array (FPGA), micro-controller, etc.). Storage component 1820 is configurable to store communication information for processing component 1810, including information related to link adaptation processes. It is appreciated that storage component 1820 can be implemented in a variety of devices (e.g., random access memory (RAM), solid state device (SSD) memory, etc.). Transmitter 1830 is configurable to produce signals for transmission on antenna 1870, including link adaptation information. Receiver 1830 is configurable to receive signals from antenna 1870, including link adaptation information. Antenna 1870 is configurable to emit or receive signals.

In one embodiment, processing component or circuit 1810 is operable to generate Modulation and Coding Scheme (MCS) Feed Back (MFB) information. The MFB information can include a field to indicate a modulation and coding scheme MCS request (MRQ) sequence identifier (MSI) information when the MFB information is in response to a solicitation request for link adaptation information and partial Physical Layer Convergence Procedure (PLCP) Protocol Data Unit (PPDU) information when the MFB information is unsolicited. The transmitter 1830 can be configured to transmit the MFB information to another station on a communication link. A receiver 1840 can be configured to receive signals from the other station on the communication link, wherein the signals are configured in accordance with the MFB information.

In one embodiment, station 1800 sends MFB information to another station. The MFB information can be sent as part of a response to a solicitation or request for the MFB information. The MFB information is sent as an part of an unsolicited action. The other station sends basic user application information back in signals that are modulated or coded in accordance with the MFB. Station 1800 receives the signals that are modulated and coded in accordance with the MFB information, increasing performance of station 1800 because it gets more information faster and with less errors In one embodiment, station 1800 sends the signals that are modulated and coded in accordance with the MFB information, increasing performance of station 1800 because it sends more information faster and with less errors. In one exemplary implementation, station 1800 forwards a request for the MFB information.

Communicating information with less errors can increase performance of station 1800. In one embodiment, when the base information or user application information communication has an error the transmitter has to expend resources and time resending the information and the receiver has to expend resources receiving the corrected information and processing it. In one sense, repetitive attempts at communications with acceptable errors can be considered re-transmission and re-processing of the base or user application information, in which the error filled initial transmission and processing adversely impact performance by consuming resources (e.g., power, occupy processing bandwidth, occupy communication bandwidth, etc.) and time.

In one embodiment, storage component 1820 stores information associating or mapping link characteristics to modulation and coding schemes. FIG. 19 is a block diagram of an exemplary table 1900 mapping link characteristics to modulation and coding schemes in accordance with one embodiment. The link characteristics of a RU 5 in the 20 Megahertz range includes 3 spatial streams and is dual carrier modulation capable. The link characteristics of RU 14 in the 40 Megahertz range includes 3 spatial streams and is dual carrier modulation capable.

FIG. 20 is a block diagram of an exemplary table 2000 mapping link characteristics to modulation and coding schemes in accordance with one embodiment. The link characteristic of a RU 5 in the 20 Megahertz range is not prone to noise and is mapped to a BCC coding scheme. The link characteristic of RU 14 in the 40 Megahertz range is a relatively noisy channel mapped to a LDPC coding scheme. The LDPC coding scheme enables better noise coping capabilities and facilitates reduced error rates on a channel or link subject to noise or interference. In one exemplary implementation, a BCC coding scheme enables more encoders to be utilized than a LDPC coding scheme facilitating faster decoding in the BBC coding scheme. Using the link adaptation information included in table 2000, processing component 1810 can direct the utilization of the BCC coding with multiple BCC compatible decoders on the 20 MHz RU5 link and the utilization of the LDPC coding with robust error mitigation on the 40 MHz RU14 link. The ability to select between coding schemes enables improved performance over a conventional device that was set to one coding scheme. For example, a conventional device with a fixed coding set to a LDPC for both the 20 MHz RU5 and 40 MHz RU14 would perform worse than being able to select the BCC for the 20 MHz RU5 since the LDPC has fewer encoders. Also, a conventional device with a fixed coding set to a BCC for both the 20 MHz RU5 and 40 MHz RU14 would perform worse than being able to select the LDPC for the 40 MHz RU14 since BCC would be more susceptible to noise on the 40 MHz RU14.

In one implementation, instructions and data can be written to and read from a storage component. The instruction can be executed by a processing component to implement a MAC layer and PHY layer of a communication system. The MAC and PHY layers can be associated with wireless communication links that are compliant with a specified wireless protocol standard. A wireless communication link can be compliant with commonly referred to as Wi-Fi communication links. A wireless communication link can be compliant with the Institute of Electrical and Electronics Engineering (IEEE) 802.11 standard.

Thus, presented embodiments can utilize the enhanced high efficiency link adaptation to enable increased network communication performance. The robust link adaptation enables improved matching of modulation, coding, and other signal parameters to features, characteristics, and conditions on a communication link. The high efficiency adaptive link embodiments can improve rates of transmission and bit error rates, which can in turn can reduce resource expenditure on error resolution and retransmission. In one embodiment, the high efficiency link adaptation is used to address the complexities of varying network link conditions. The high efficiency link adaptation can be used to overcome various communication impediments (e.g., fading, scattering, power decay, etc.) and improve performance of the communication network devices. High efficiency link adaptation improved communication can also increase performance of devices (e.g., computers, tablets, cell phones, computer-related technologies, etc.) communicatively coupled to the network.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical or quantum computing device) that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as suited to the particular use contemplated. It is intended that the scope of the invention be defined by the Claims appended hereto and their equivalents. The listing of steps within method claims do not imply any particular order to performing the steps, unless explicitly stated in the claims.

What is claimed:

1. A system comprising:
a communication device configured to forward link adaptation information, wherein the link adaptation information comprises Modulation and Coding Scheme (MCS) Feed Back (MFB) related information in a communication frame that includes a first field and a second field, wherein:
the first field indicates one of: that the information is being forwarded as unsolicited MFB information; and that the information is associated with a solicitation request for the MFB information, and
the second field indicates one of: that the information is MFB information; and that the information is a request for MFB information, wherein the second field is reserved in response to the first field including an unsolicited indication; and
a communication component configured to receive the link adaptation information.

2. The system of claim 1, wherein the link adaptation information further comprises high efficiency link adaptation (HLA) information.

3. The system of claim 1, wherein:
the first field is an unsolicited MFB field comprising one bit, wherein when the bit is a logical 1, the field indicates an associated frame comprises unsolicited MFB information, and when the bit is a logical 0, the field indicates the associated frame comprises MFB information associated with a request; and
the second field is an MRQ field comprising one bit, wherein when the bit is a logical 1, the associated frame comprises a request for MFB information and when the bit is a logical 0, the associated frame comprises solicited MFB information in response to the request.

4. The system of claim 1, wherein the link adaptation information is a request for the MFB feedback information, and comprising:
a field comprising an indication of a resource unit (RU) that initiated the request for the MFB information;
a field comprising an indication of a bandwidth (BW) that initiated the request for the MFB information; and
a field comprising an indication of an MRQ sequence identifier (MSI).

5. The system of claim 4, wherein the field comprising an indication of an MRQ sequence identifier shares the field with a partial PPDU parameter subfield comprising two bits that indicate a format of a PPDU under estimation and one bit that indicates a coding type of the PPDU under estimation.

6. The system of claim 1, wherein the link adaptation information is a solicited response for the MFB feedback information, and comprising:
a field comprising an indication of a recommended NSS;
a field comprising an indication of a recommended HE MCS;
a field comprising an indication whether HE MCS is DCM; and
a field comprising an indication of an MRQ sequence identifier (MSI).

7. The system of claim 1, wherein the link adaptation information is an unsolicited forwarding of MFB feedback information, and comprising:
a field comprising an indication of a recommended NSS;
a field comprising an indication of a recommended HE MCS;
a field comprising an indication whether HE MCS is DCM;
a field comprising an indication of a resource unit (RU) that MFB recommended;
a field comprising an indication of bandwidth the MFB applies;
a field comprising an indication of partial parameters of PPDU under estimation; and
a field comprising an indication if the PPDU under consideration is beamformed.

8. The system of claim 7, wherein the field comprising an indication if the PPDU under consideration is beamformed is shared with a field comprising an indication of an MRQ sequence identifier (MSI).

9. The system of claim 1, wherein the system is part of a wireless local area network (WLAN).

10. A communication method comprising:
performing a link adaptation process, including receiving link adaptation information in a communication frame comprising:
a first field set of bits identifying whether the MFB information is associated with a solicited request for feedback, and
a second field indicating whether the information is being forwarded as unsolicited MFB information or as a response to a solicitation request for the MFB information, wherein the second field is reserved in response to the first field including an unsolicited indication; and
communicating information via the communication link in accordance with the link adaptation information.

11. The communication method of claim 10, wherein the link adaptation information is related to Modulation and Coding Scheme (MCS) Feed Back (MFB) information.

12. The communication method of claim 10, wherein the communication link is a wireless link.

13. The communication method of claim 10, wherein the communication link is IEEE 802.11 compatible.

14. The communication method of claim 10, wherein the communicating information comprises modulating communication link signals in accordance with the link adaptation information.

15. The communication method of claim 10, wherein the communicating information comprises coding communication link signals in accordance with the link adaptation information.

16. A communication station, comprising,
a processing circuit operable to generate Modulation and Coding Scheme (MCS) Feed Back (MFB) information, wherein the MFB information comprises a field to indicate a modulation and coding scheme request (MRQ) sequence identifier (MSI) information when the MFB information is in response to a solicitation request for link adaptation information and partial Physical Layer Convergence Procedure (PLCP) Protocol Data Unit (PPDU) information when the MFB information is unsolicited; and
a transmitter to transmit the MFB information to another station on a communication link, wherein the MFB information is high efficiency link adaptation (HLA) information that includes a bit in an MFB field and a bit in an MRQ field which selectively identify a link adaptation control that comprises a solicited HLA MFB control type operable to respond to sounding and forward LA information during regular frame exchange; and a receiver to receive signals from the other station on the communication link, wherein the signals are configured in accordance with the MFB information.

17. The communication station of claim 16 wherein the MFB information includes resource unit (RU) allocation information.

18. The communication station of claim 16, wherein the PPDU selectively includes information from a set of parameters associated with a high efficiency single user (HE_SU) configuration, a high efficiency multiple user (HE_MU) configuration, a high efficiency high efficiency extended range (HE_EXT) configuration, and a high efficiency trigger (HE_TRIG) configuration.

19. The communication station of claim 16, wherein unsolicited MFB information is forwarded during regular fame exchange.

20. The communication station of claim 16, wherein the MFB information is high efficiency link adaptation (HLA) information that includes a bit in an unsolicited MFB field and a bit in an MRQ field to identify a selection of one of three types of link adaptation control, wherein the three types of link adaptation control comprise:

a HLA MFB request control type operable to request MFB information, a solicited HLA MFB control type operable to respond to an MFB request, and a solicited HLA MFB control type operable to respond to sounding and forward LA information during regular frame exchange.

21. The communications station of claim 16, wherein a station collects multiple link quality data by TF+HLA request and UL TRIG PPDU response.

* * * * *